(12) United States Patent
Niiyama et al.

(10) Patent No.: US 6,806,924 B2
(45) Date of Patent: Oct. 19, 2004

(54) LIQUID CRYSTAL DISPLAY ELEMENT

(75) Inventors: Satoshi Niiyama, Kanagawa (JP); Noriko Suehiro, Kanagawa (JP)

(73) Assignee: OPTREX Corporation, Tokyo (JP)

(*) Notice: Subject to any disclaimer, the term of this patent is extended or adjusted under 35 U.S.C. 154(b) by 100 days.

(21) Appl. No.: 10/245,690

(22) Filed: Sep. 18, 2002

(65) Prior Publication Data

US 2003/0071936 A1 Apr. 17, 2003

(30) Foreign Application Priority Data

Sep. 19, 2001 (JP) .................................. 2001-285979
Sep. 28, 2001 (JP) .................................. 2001-302928
Sep. 28, 2001 (JP) .................................. 2001-304596

(51) Int. Cl.$^7$ .................................................. G02F 1/133
(52) U.S. Cl. ................................. 349/72; 349/169
(58) Field of Search ................................. 349/73, 169

(56) References Cited

U.S. PATENT DOCUMENTS 6,433,843 B1 * 8/2002 Okada et al. .................. 349/78
6,602,563 B2 * 8/2003 Kobayashi et al. .......... 428/1.3
6,654,080 B1 * 11/2003 Khan et al. .................... 349/73

* cited by examiner

*Primary Examiner*—Tarifur R. Chowdhury
*Assistant Examiner*—Richard H Kim
(74) *Attorney, Agent, or Firm*—Oblon, Spivak, McClelland, Maier & Neustadt, P.C.

(57) ABSTRACT

There are provided at least two liquid crystal panels 10, 20 including the liquid crystals developing a memory effect, the liquid crystal developing a memory effect on a no-viewer side has a selective reflection wavelength set at 615 nm to 665 nm, the liquid crystal developing a memory effect on a viewer side has a selective reflection wavelength set at 490 nm to 540 nm, and a color filter 40 having a certain transmission property is provided between the liquid crystal developing a memory effect on the viewer side and the liquid crystal developing a memory effect on the no-viewer side.

17 Claims, 10 Drawing Sheets

Today's Special

Florida Grapefruit

Regular Price  ¥98
¥140 each

| Priority to white when C light source is the target |
|---|
| One selected in a range of substantially (570 to 630) nm and one selected in a range of substantially (440 to 500) nm are combined. |
| Example 1)   570              440 |
| Example 2)   580              440 |
| Example 3)   590 to 600       440 |
| Example 4)   620 to 630       440 |

| Combination | YonmaxCR | x | y |
|---|---|---|---|
| 440 on 575 | 53 | 0.3 | 0.318 |
| 480 on 595 | 47.4 | 0.309 | 0.322 |
| 530 on 600 | 61.8 | 0.331 | 0.415 |
| 500 on 600 | 53.3 | 0.296 | 0.35 |
| 550 on 650 | 62.4 | 0.375 | 0.420 |
| Newspaper | 83.2 | 0.328 | 0.334 |
| C Light Source | | 0.3101 | 0.3163 |

|  | Color | Y | x | y | Distance from C light source |
|---|---|---|---|---|---|
| Provision of single layer | Orange (620) | 36.0 | 0.472 | 0.412 | 0.188 |
|  | Blue (490) | 23.6 | 0.168 | 0.249 | 0.158 |
| Provision of layers | White | 44.3 | 0.288 | 0.305 | 0.025 |
|  | Black | 7.1 | 0.243 | 0.247 | 0.096 |
|  | Orange | 27.1 | 0.413 | 0.361 | 0.113 |
|  | Blue | 25.9 | 0.183 | 0.246 | 0.145 |
|  | Newspaper | 83.2 | 0.328 | 0.334 |  |
|  | C light source |  | 0.3101 | 0.3163 |  |

|  | Color | Y | x | y | Distance from C light source |
|---|---|---|---|---|---|
| Provision of single layer | Orange (635) | 31.7 | 0.484 | 0.388 | 0.189 |
|  | Green (530) | 49.0 | 0.268 | 0.462 | 0.152 |
| Provision of filter | 635+#04 | 18.1 | 0.567 | 0.376 |  |
| Provision of layers | White | 60.8 | 0.343 | 0.433 | 0.121 |
|  | Black | 6.3 | 0.305 | 0.288 | 0.029 |
|  | Red | 18.4 | 0.486 | 0.349 | 0.178 |
|  | Green | 46.9 | 0.276 | 0.458 | 0.146 |
|  | Newspaper | 83.2 | 0.328 | 0.334 |  |
|  | C light source |  | 0.3101 | 0.3163 |  |

LIQUID CRYSTAL DISPLAY ELEMENT

The present invention relates to a liquid crystal display device wherein two liquid crystal panels, each of which includes a liquid crystal developing a memory effect, are provided in layers. More specifically, the present invention relates to a liquid crystal display device providing black and white display and to a liquid crystal display device capable of providing clear red display without degrading the brightness of black and white display.

It has been known that three liquid crystal panels having different selective reflection wavelengths of R, G and B can be provided in layers in order to provide black and white display by liquid crystal panels utilizing chiral nematic crystals or cholesteric liquid crystals (liquid crystals developing a memory effect). However, it is practically preferable in terms of driving voltage, cost or another factor that the liquid crystal panels are provided in two layers.

A chiral nematic crystal, which is sandwiched between a pair of transparent electrode substrates, has a structure that its director turns through one revolution while twisting at a certain cycle (hereinbelow, referred as to the helical pitch). When the central axes in the twisted structure (hereinbelow, referred as to the helical axes) are averagely aligned perpendicular to the substrates, circular polarized light is reflected corresponding to the twist direction.

The central wavelength of the reflected light is almost equal to the product of the helical pitch and the average refractive index of the liquid crystal composition. The helical pitch is determined according to the formula of $p=1/(c \cdot HTP)$ based on the adding amount c of a photoactive material, such as a chiral agent, and the constant of the photoactive material HTP (Helical Twisting Power). Thus, the reflection wavelength can be arbitrarily controlled by selection of the type of the photoactive material and the adding amount.

The phenomenon that a chiral nematic crystal reflects circular polarized light having a specific wavelength that depends on the helical pitch and the refractive index of the liquid crystal is called selective reflection. The liquid crystal alignment that exhibits the selective reflection is called a planar alignment, wherein the average direction of the helical axes in a plurality of separated liquid crystal domains is substantially perpendicular to the substrate surfaces.

A chiral nematic crystal can have another liquid crystal alignment (focal conic structure) different from the alignment just stated, wherein the helical axes in a plurality of liquid crystal domains face to random directions or a nonperpendicular direction to the substrate surfaces. The liquid crystal layer in a focal conic state is in a slightly scattered state as a whole and does not reflect light having a specific wavelength as in the selective reflection.

Even when no electric field is applied, both states (the planar state and the focal conic state) are stable. The selective reflection in the planar state is bright due to no need for a polarizer and provides a wide viewing angle. A liquid crystal display element that includes a chiral nematic crystal to utilize the selective reflection thereof can be provided as a liquid crystal display element having lower power consumption since the liquid crystal alignment can be maintained to make the element function as a type developing a memory effect even when no electric field is applied.

The applied voltage can be controlled to exhibit a state having an intermediate optical property between the planar alignment and the focal conic alignment after voltage application or to have, in the transitional process, a homeotropic state wherein crystal molecules are aligned in the direction of an electric field.

When liquid crystal display elements having a chiral nematic liquid crystal are used, full color display can be provided by fabricating three types of liquid crystal panels so as to have different liquid crystal pitches and exhibit different sorts of color selective reflection of R, G and B, and arranging these panels one after another. When the panels are put one after another, the panels are normally put one after another in order of shortness in the selective reflection wavelength, such as the order of blue, green and red, as viewed from the display side in terms of display quality (see, e.g., JP-A-11-64895).

Two types of liquid crystal panels can be combined to provide multicolor display, though the combination cannot provide full color display. In the case of combining two types of liquid crystal panels, a specific combination of selectively reflected colors can provide black and white display.

However, the provision of multicolor display by a combination of two layers of liquid crystal panels has created several problems from turbidity in a displayed color or a degrade in color purity since black and white display varies according to, in particular, the panel structure, the liquid crystal materials or the like. Especially, it is one of the key issues to display white in achromatic fashion. It is a first object of the present invention to resolve this issue.

By the way, it is difficult to realize both clear black and white display having high contrast and red display having high color purity by only combining a liquid crystal panel having a central wavelength (dominant wavelength) in selective reflection on a long wavelength side and a liquid crystal panel having a central wavelength (dominant wavelength) in selective reflection on a short wavelength side in a two-layered structure.

This is because when the selective reflection wavelength is set on a long wavelength side to obtain red display, the helical axes of the liquid crystals face to variety of directions, light is widely scattered in a planar state, the half width of the selective reflection wavelength is widened to provide a broad range of reflection property, and the color purity is lowered to make a shift from yellow to brownish color.

Even in the case of a two-layered structure, an auxiliary color filer can be provided between a liquid crystal panel on the long wavelength side and a liquid crystal panel on the short wavelength side to realize both clear black and white display and red display. In this case, it is an important issue to prevent the brightness and the contrast in black and white display from degrading.

From this viewpoint, it is a second object of the present invention to provide a liquid crystal display device capable of realizing multi-color display including good black and white display and clear red display when two liquid crystal panels having liquid crystals developing a memory effect are provided in layers so as to sandwich a color layer therebetween in order to black, white and red display.

In order to solve the objects, according to a first aspect of the present invention, there is provided a liquid crystal display device comprising a first liquid crystal panel and a second liquid crystal panel; the first liquid crystal panel and the second liquid crystal panel exhibiting at least two stable states of a planar state and a focal conic state with no voltage applied; the first liquid crystal panel and the second liquid crystal panel including liquid crystals developing a memory effect, the liquid crystals having selective reflection wavelengths in the planar state appearing in a visible range, the first liquid crystal panel and the second liquid crystal panel having different selective reflection wavelengths; the first liquid crystal panel having a shorter selective reflection wavelength and the second liquid crystal panel having a longer selective reflection wavelength being combined to be respectively provided on a viewer side and on a no-viewer side; the selective reflection wavelength of the first liquid crystal panel being set in a range from 430 nm to 540 nm, and the selective reflection wavelength of the second liquid crystal panel being set in a range from 560 nm to 665 nm, whereby at least black display and white display can be provided.

It is preferable that chromaticities lie in a region surrounded by four points of (0.29, 0.29), (0.35, 0.29), (0.29, 0.36) and (0.35, 0.36) on C.I.E. 1931 chromaticity coordinates, the chromaticities being observed by a viewer when the first and second liquid crystal panels are provided in layers both panels being in the planar state.

It is preferable that the selective reflection wavelength of the first liquid panel is in a range from 430 nm to 510 nm, and the selective reflection wavelength of the second liquid panel is in a range of from 560 nm to 660 nm.

It is preferable that the liquid crystal of the first liquid panel and the liquid crystal of the second liquid panel have a color layer having a certain transmissive property, whereby display in a third color can be provided in addition to the black display and the white display.

It is preferable that the selective reflection wavelength of the first liquid panel is in a range from 490 nm to 540 nm, the selective reflection wavelength of the second liquid panel is in a range of from 615 nm to 665 nm, and a color layer in red is provided for red display.

It is preferable that a transmission property of the color layer is set such that a transmissivity at a wavelength shorter than the selective reflection wavelength of the second liquid crystal panel by 70 nm is not higher than 85% of a transmissivity at a wavelength shorter than the selective reflection wavelength by 30 nm.

It is preferable that red display is provided by a color lying in a region delimited by connecting four points of (0.47, 0.30), (0.60, 0.30), (0.47, 0.40) and (0.60, 0.40) on C.I.E. chromaticity coordinates, and that the white display is provided by a color lying in a region delimited by connecting four points of (0.29, 0.29), (0.35, 0.29), (0.29, 0.44) and (0.35, 0.44) on the C.I.E. chromaticity coordinates.

According to a second aspect of the present invention, there is provided a liquid crystal display device comprising a first liquid crystal panel and a second liquid crystal panel; the first liquid crystal panel and the second liquid crystal panel exhibiting at least two stable states of a planar state and a focal conic state with no voltage applied; the first liquid crystal panel and the second liquid crystal panel including liquid crystals developing a memory effect, the liquid crystals having selective reflection wavelengths in the planar state appearing in a visible range, the first liquid crystal panel and the second liquid crystal panel having different selective reflection wavelengths; the first liquid crystal panel having a shorter selective reflection wavelength and the second liquid crystal panel having a longer selective reflection wavelength being combined to be respectively provided on a viewer side and on a no-viewer side; and a color layer provided between the liquid crystal of the first liquid crystal panel and the liquid crystal of the second liquid crystal panel, the color layer having a transmission property that is set such that a transmissivity at a wavelength shorter than the selective reflection wavelength of the second liquid crystal panel by 70 nm is not higher than 85% of a transmissivity at a wavelength shorter than the selective reflection wavelength by 30 nm.

It is preferable that when the selective reflection wavelength of the second liquid panel is in a range from 630 nm to 640 nm, the color layer provided between the second liquid crystal panel and the first liquid crystal panel has a transmission property that is set such that a transmissivity at a wavelength in a range from 560 nm to 570 nm is not higher than 85% of a transmissivity at a wavelength in a range from 600 nm to 610 nm.

It is preferable that when the selective reflection wavelength of the second liquid panel is in a range from 645 nm to 655 nm, the color layer provided between the second liquid crystal panel and the first liquid crystal panel has a transmission property that is set such that a transmissivity at a wavelength in a range from 575 nm to 585 nm is not higher than 70% of a transmissivity at a wavelength in a range from 615 nm to 625 nm.

It is preferable that the liquid crystals developing a memory effect are chiral nematic liquid crystals or cholesteric liquid crystals.

According to a third aspect of the present invention, there is provided a method for preparing a liquid crystal display device, which includes liquid crystals developing a memory effect, the liquid crystals exhibiting at least two stable states of a selective reflection state and a transmissive state with no voltage applied; and a first liquid crystal panel and a second liquid crystal panel provided in layers, the first liquid crystal panel and the second liquid crystal panel having different selective reflection wavelengths; the method comprising providing a color layer on a rear side; controlling the selective reflection wavelengths of the respective liquid crystal panels so that a point at a right middle between coordinates corresponding to two developed colors lies at a position apart from a white point under a standard light source by a distance of not greater than 0.03 on C.I.E. xy chromaticity coordinates when the two developed colors are indicated on the xy chromaticity coordinates with one of the liquid crystal panels being in the selective reflection state, and the other being in the transmissive state; and providing white by mixing at least the two developed colors and a color (except white) developed by the color layer.

It is preferable that the method further comprises providing a filter layer having a specific transmissive color between the first liquid crystal panel and the second liquid crystal panel; and providing at least the color (except white) developed by the color layer, white prepared by the two developed colors and the filter layer, and red prepared by the filter layer.

It is preferable that the method further comprises providing the filter layer by use of a resist having a light transmissive property; providing the filter layer in contact with the liquid crystal of the liquid crystal panel on a no-viewer side; and providing the filter layer under a driving electrode.

It is preferable that red display lies in a range of X=0.43 to 0.50 and y=0.29 to 0.37 on the xy chromaticity coordinates.

It is preferable that a pigment resist is provided as the color layer.

It is preferable that the standard light source is C light source.

Figures 10A, 10B:
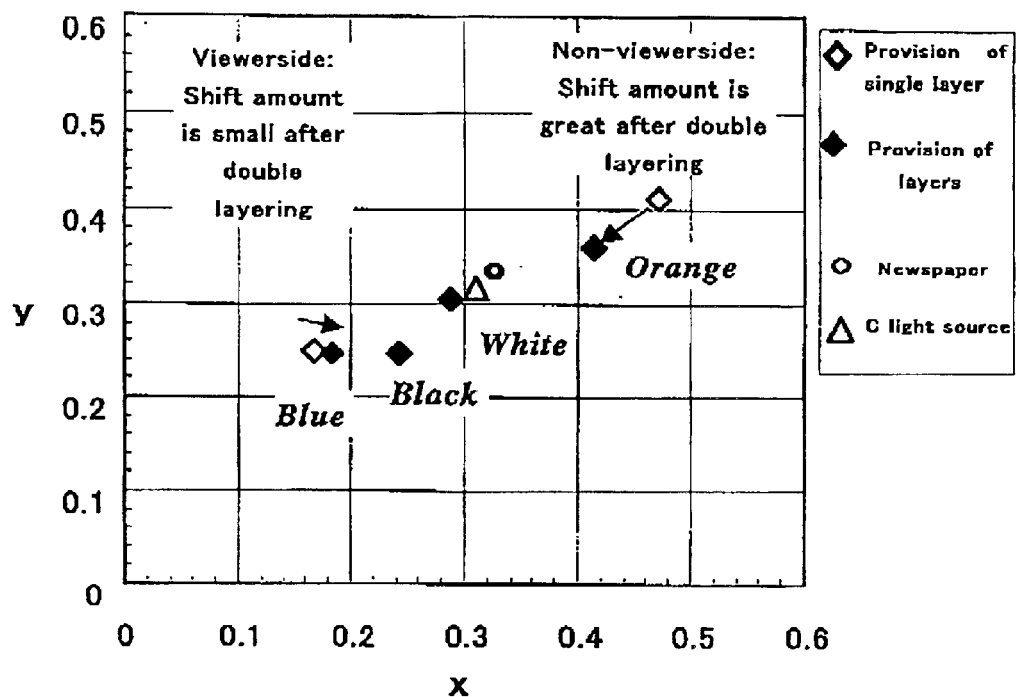
Figures 11A, 11B:
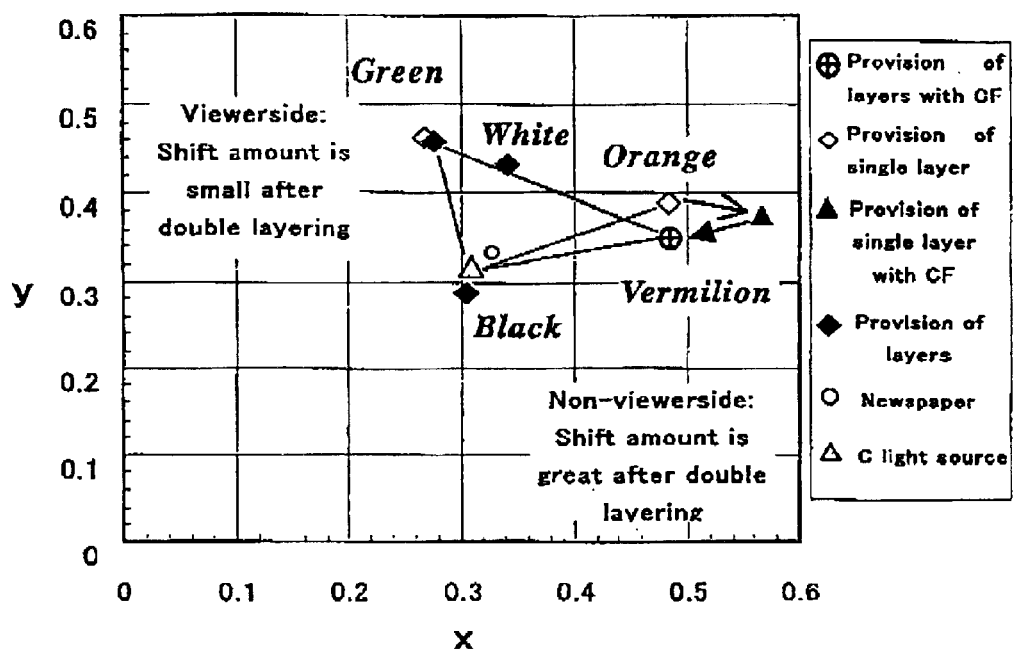

FIGS. 10A and 10B are a diagram of chromaticity coordinates and coordinate data, showing color shifts in a liquid crystal panel or panels without a filer layer (Black is almost a color of "Black paint"); and FIGS. 11A and 11B are a diagram of chromaticity coordinates and coordinate data, showing color shifts in a liquid crystal panel or panels in a combination with a filer layer (Black is almost a color of "Black paint").

In the liquid crystal display device according to the present invention, two liquid crystal panels, which display selective reflection colors and develop a memory effect, are provided in layers, and a black layer is provided on a no-viewer side (rear side) of the device. When one of the liquid crystal panels is in a reflective state, and the other is in a transmissive state, displayed colors under a standard light source are indicated on C.I.E. 1931 chromaticity coordinates as follows: The selective wavelengths of the respective liquid panels are controlled so that the point at the middle between the coordinates corresponding to the two displayed colors lies at a position apart from the white point corresponding to the standard light source by a distance of not greater than 0.03.

Additionally, at least two colors of black display and white display are provided throughout the screen by controlling an electric field so that each of the respective panels have binary phase states of the reflection state and the transmission state.

It is preferable that the standard light source C is utilized as the light source.

In the case of a two layered liquid crystal display device wherein the two liquid crystal panels have a red filter provided therebetween to control the selective reflection color of the liquid crystal panel on the no-viewer side, the red filter having a specific transmissive color (a wavelength range having a transmissivity of not greater than 85% of a maximum transmission range) in the area from 560 nm to 600 nm, the selective reflection wavelengths of the respective panels are controlled as follows:

When a first point indicating the selective reflection color under the standard light source C in the case of the liquid crystal panel on the viewer side being in the reflective state and a second point indicating the selective reflection color under the standard light source C in the case of the liquid crystal panel on the viewer side being in the transmissive state and the liquid crystal panel on the no-viewer side being in the selective reflection state are indicated on C.I.E. 1931 chromaticity coordinates, the selective reflection wavelengths of the respective liquid panels are controlled so that the point at the middle between the two points lies at a position apart from a point P (0.4, 0.4) under the standard light source by a distance of not greater than 0.03. The point P lies on a linear line connecting between the original point and the standard light source and is defined as a point that is apart from the white point by a distance of $0.1 \cdot \sqrt{2}$.

Additionally, at least three colors of black display, white display and red display are provided throughout the screen by controlling an electric field so that each of the respective panels have binary phase states of the reflection state and the transmission state.

In this case, it is preferable that chromaticity coordinates in red display lie in a range of (X=0.43 to 0.50, y=0.29 to 0.37).

It is preferable that the white point as the target is apart from the white point under the standard light source by a distance shorter than 0.03.

It is preferable that the liquid crystal display panels are chiral nematic liquid crystal display elements or cholesteric liquid crystal display elements, that the transmissive state is the focal conic state, and that the reflective state is the planar state.

It is preferable that a filter layer is provided under driving electrodes and in contact with the liquid crystal developing a memory effect of the liquid crystal panel on the no-viewer side, and that filter layer is a photosensitive resist having a light transmissive property.

In order to explain how to configure the two liquid crystal display panels for a display including "red", FIGS. 6A, 6B, 6C and 7 are shown.

Figure 6A:
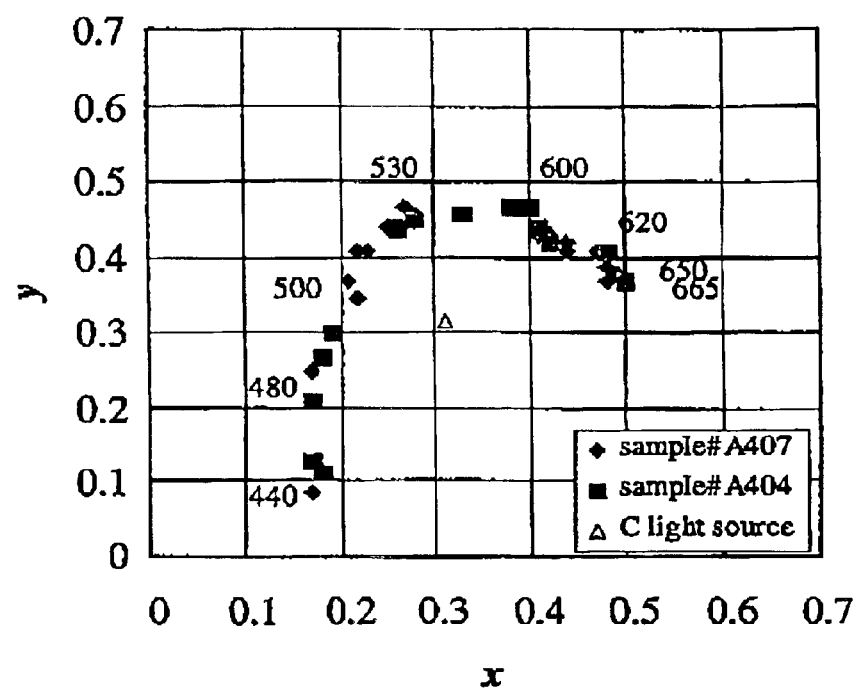
FIGS. 6A, 6B and 6C are diagrams of chromaticity coordinates and coordinate data, showing plots of color developed by the combined two liquid crystal panels.

FIG. 6A shows a plurality of plots on the C.I.E. 1931 chromaticity coordinates of the colors developed by the selective reflection wavelength of each single liquid crystal panel which is produced by changing the p in LC layer, mainly tuning the relative amount of LC material and the chiral dopant in LC layer.

Figure 6B:
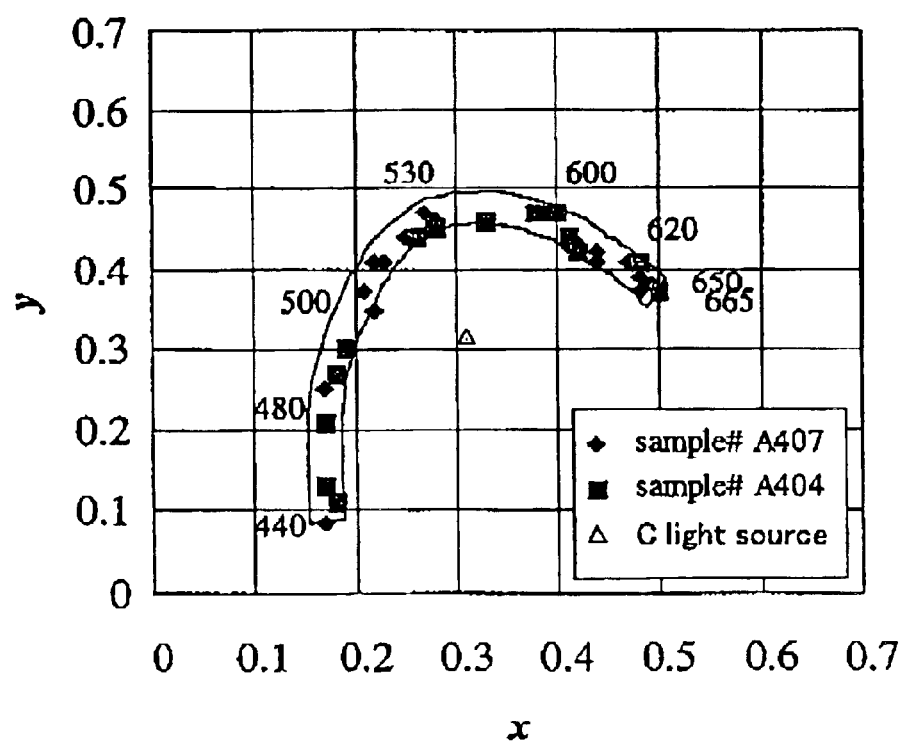

The base LC material and the cell gap is almost same in all these samples. A407 and A404 described in FIG. 6A and FIG. 6B are inhouse code of LC material. Δε is about 15–16 and Δn is about 0.23. It is possible to adjust the p by tuning Δn, d, the material of orientation layer and the LC material.

FIG. 6B shows a color curbed band being along with said many plots on chromaticity graph.

Figure 6C:
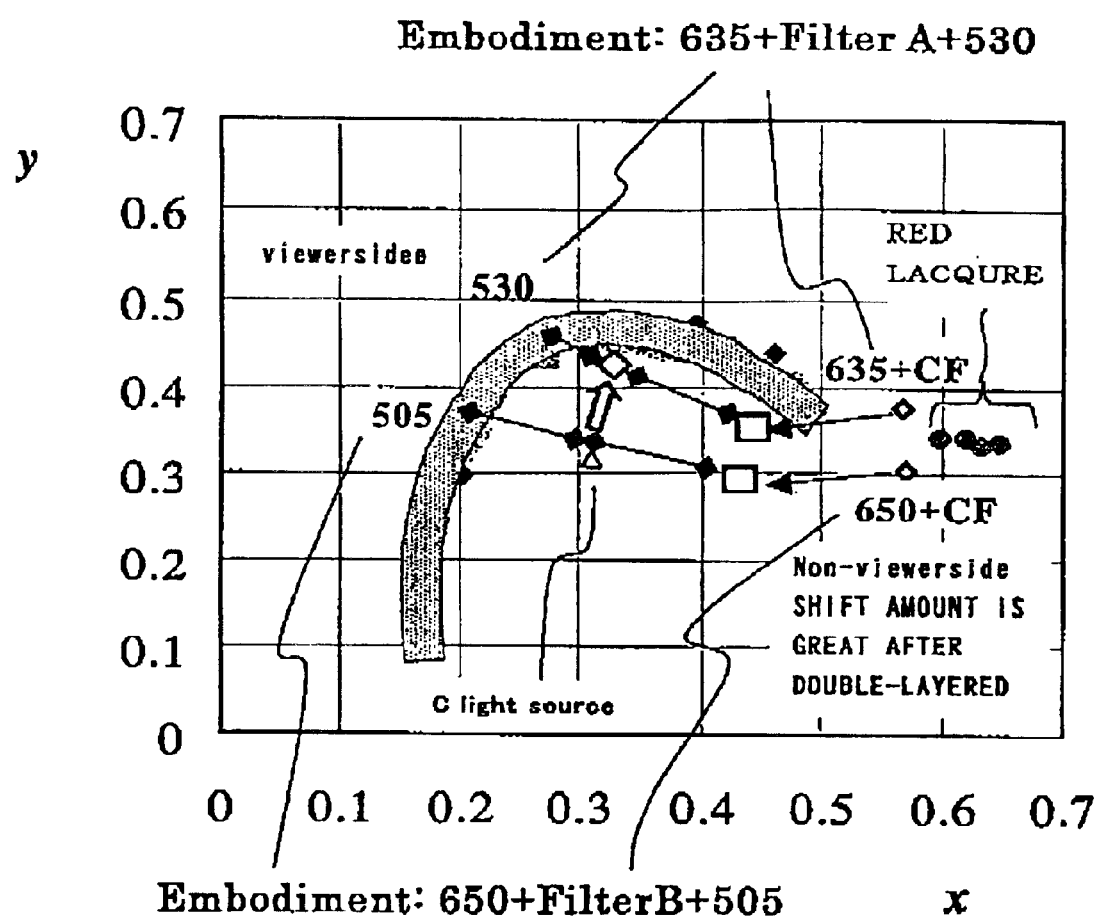
Figure 7:
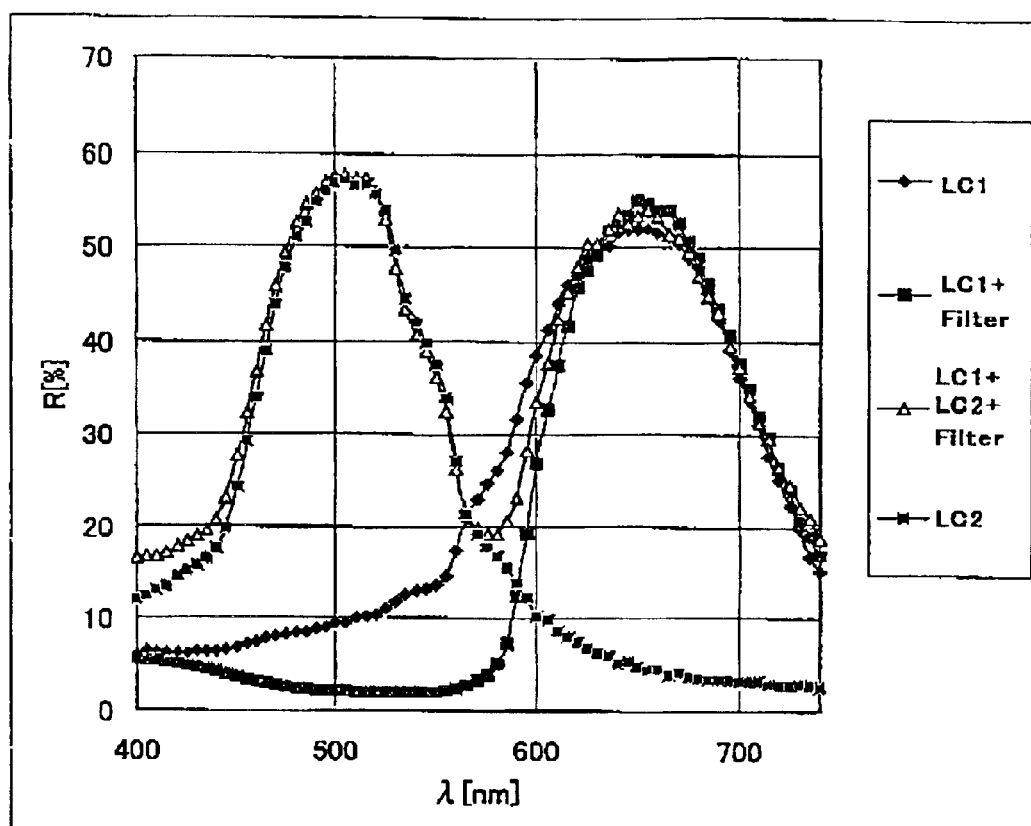
FIG. 7 is a spectral diagram showing selective reflection colors.
Figures 8A, 8B:
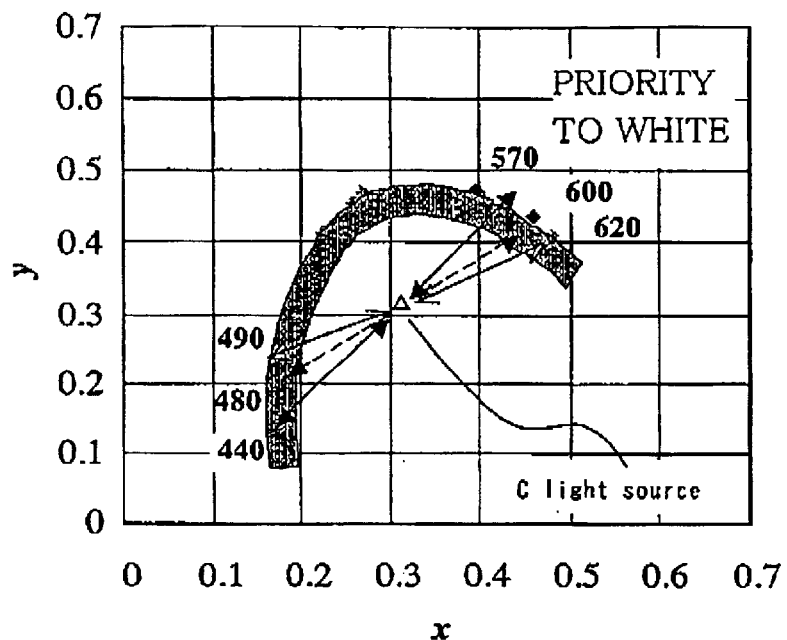
FIGS. 8A and 8B are a diagram of chromaticity coordinates and coordinate data, showing how to make settings in the case of giving priority to white.

FIG. 6C shows how to obtain a display including a "red" and "white" on a same display by combining a color filer with two LC panels.

The color curbed band does not pass on the color coordinates of good red color such as "red lacquer". In order to deal with this problem, the liquid crystal display panels are combined with the filter layer or a color layer to eliminate wavelength components unnecessary to developing in the first embodiment of the present invention. See FIG. 7 that show a spectrum of a selective reflection characteristic of a chiral nematic liquid crystal display.

In the case of both first liquid crystal display panel and second liquid crystal display panel on the long wavelength side having different selective reflection wavelengths, and the screens of both liquid crystal display panels being provided so as to overlap each other, when the second liquid crystal display panel is provided on the no-viewer side, there occurs a color shift toward a neutral side with the result that the displayed color is slightly shifted toward red (in a downward direction of y coordinate) in comparison with the displayed color in the case of a single layer without a filer layer.

In this case, a viewing through on an oblique angle will make a color shift. It is caused by a substantial effective change of p in LC layer between in a perpendicular view to the display surface and an oblique view to the display surface. So it is preferable to set LC panels to fit with an oblique view in general uses of LCD.

In FIG. 6C, a display including "red" is obtained by combination with a color filter. A color shift will be also come out by stacking two LC panels, compared to a view in a single LC panel. A color position of a LC panel having a longer wavelength in a stacked constitution is shown on mark of □ on graph. A color chromaticity in single panel with a filter layer is shown on mark of ◇ on graph. A color shift is occurred in a stacked LC panels to generate a multicolored display.

A set of two lines marked with ♦ at its end shows a method to combine the two LC panels to generate a "red" color in this case.

With respect to the second liquid crystal display panel on the short wavelength side, a combination of developed colors may be selected to lie at a point apart from the white point as the target by substantially the same distance as the red display as stated earlier in consideration of an viewing angle, brightness and hue. Since a combination of the filter layer increases the viewing angle dependency, a significant change in color is created in a slant view different from the direct front view where good developed colors are available. In order to avoid this problem, it is preferable, for example, that the red display is set as fine red slightly close to orange instead of deep red, and that the white display is set as being slightly close to green. These settings can reduce the viewing angle dependency. In order to improve the visual transmissivity of white, the white display as the target is set as being closer to green as the brightness reduction (absorption) by the filter layer becomes greater. The filter layer can absorb wavelengths on the short wavelength side to improve the display level in black, which results in improvement in contrast ratio.

In order to basically provide black display and white display without providing red display, the selective reflection colors of the two liquid crystal panels may be imaginarily set as being equidistant each other around C light source on the chromaticity coordinates. Since a loss is created in the reflected light from the no-viewer side, the selective reflection colors may be actually set such that the distance close to the long wavelength becomes slightly longer on the chromaticity coordinates. The deviation is preferably 20% or less.

In order to improve the visual transmissivity in white display, the color center may be displaced from C light source slightly toward green. However, as the displacement amount (the shift amount toward green) becomes greater, the white display becomes more greenish irrespective of the presence and absence of the filter layer. A combination in the case of giving priority to white and a combination in the case of giving priority to brightness are shown in FIGS. 8A and 8B and FIGS. 9A and 9B.

Figures 9A, 9B:
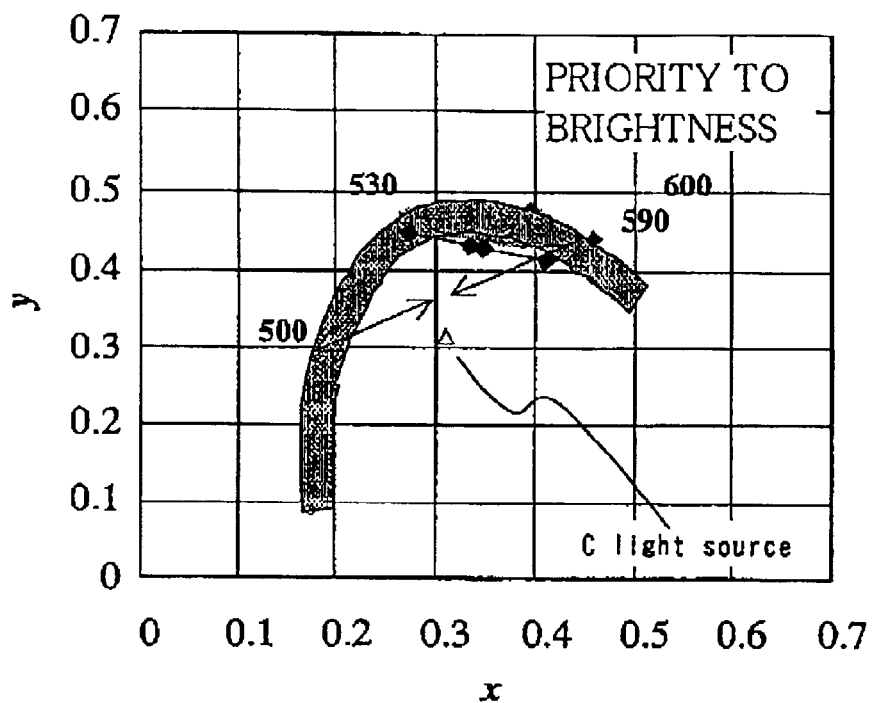
FIGS. 9A and 9B are a diagram of chromaticity coordinates and coordinate data, showing how to make settings in the case of giving priority to brightness.

In FIG. 9A, a relatively brighter display is obtained by adjusting a color position of two LC panels to be shifted toward a green color region on a chromaticity graph.

Because a green color is better sensitive for a person than the other colors. The each color tends to be a bit greenish by sliding its selective reflection color (wavelength) toward green region. But the display will become to be brighter for a viewer.

Explanation of how to control the degree of whiteness in white display will be explained in FIGS. 10A and 10B and FIGS. 11A and 11B.

The standard light source utilized in the present invention is prescribed in JIS Z8720, which covers the technique prescribed in C.I.E. No. 15.2. JIS Z8720 prescribes that the C light source "is utilized to indicate the color of an object to be developed by daylight. Now, explanation will be made in reference to the accompanying drawings.

Figure 1:
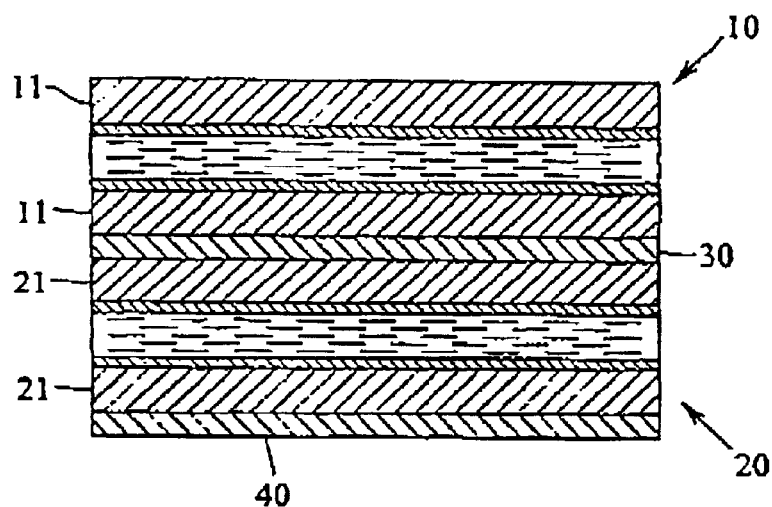
FIG. 1 is a schematic cross-sectional view showing the liquid crystal display device according to a first embodiment of the present invention.

As shown in the schematic cross-sectional view of FIG. 1, the liquid crystal display device according to a first embodiment of the present invention includes two liquid crystal panels of a first liquid crystal panel 10 provided on a viewer side (an upper side in FIG. 1) and a second liquid crystal panel 20 provided on a side opposite to the viewer side (a lower side in FIG. 1 and also called a rear side), and both liquid crystal panels 10, 20 are provided in layers with a color filter 30 as a color layer sandwiched therebetween.

Each of the liquid crystal panels 10, 20 has a pair of transparent electrode substrates 11, 11 or 21, 21 provided therein so as to confront each other. Between the respective paired transparent electrode substrates is sandwiched a liquid crystal developing a memory effect (a chiral nematic liquid crystal in this embodiment), which exhibits at least two stable states of a planar state and a focal conic state with no a voltage applied.

The second liquid crystal panel 20 on the rear side has a rear surface provided with a light-absorbing layer 40 (a black paint coating in the embodiment). The liquid crystal display device can be provided in a segment type or dot matrix type of display fashion.

Although both liquid crystal panels 10, 20 have the wavelength bands of the selective reflection in the planar state appearing in a visible region, the wavelength band of the first liquid crystal panel 10 on the viewer side relatively lies on a short wavelength side while the wavelength band of the second liquid crystal panel 10 on the side opposite to the viewer side lies on a longer wavelength side than that of the first liquid crystal panel.

In accordance with the present invention, a filter, which has a transmission property is set such that a transmissivity at a wavelength shorter than the selective reflection wavelength (dominant wavelength) of the second liquid crystal panel 20 on the rear side by 70 nm is not higher than 85% of a transmissivity at a wavelength shorter than the selective reflection wavelength by 30 nm, is utilized as the color filter 30 in order to provide clear red display without degrading the brightness in black and white display. The reason is as follows:

What is important to improve the color purity of red display with the quality level of white display kept to some extent is to restrain only wave components unnecessary to certain color illumination while ensuring reflectance throughout the entire wavelength range as much as possible. Although it is enough to remove all wave components shorter than a certain wavelength in consideration of only red display, reflection components necessary to bright white display are widely lost in this case.

In other words, in order to realize bright black and white display, it is desirable to ensure the reflectance of the second liquid crystal panel 20 on the long wavelength side throughout a wide range as much as possible. In order to simultaneously realize red display having high color purity, it is important that only components in a specific wavelength range, which are supposed to give fatal damage to red display, are suppressed among reflection wavelength components on the long wavelength side. With respect to the degree of suppression in the components in the specific wavelength range, complete removal is not necessary, and it is sufficient that a lower reflectance than the reflectances in the other wavelength ranges by a certain level is ensured.

When the colored filter 30, which was prepared so as to have the optical transmissivity sharply lowered in a specific wavelength range, i.e., the range from a shorter wavelength than the selective reflection wavelength (dominant wavelength) of the second liquid crystal panel 20 on the side opposite to the viewer side by about 30 nm to a shorter wavelength than the selective reflection wavelength by about 70 nm and to have the optical transmissivity set high in the other wavelength ranges based on the finding as stated earlier, was provided between the liquid crystal panels 10, 20, clear red display was able to be provided without significantly degrading the brightness in white display.

With regard to the selective reflection wavelength of the first liquid panel 10 on the viewer side, even a slight change of plus or minus 5 nm can cause a change in hue when white display is provided by a combination with the color filter 30. For example, in the case wherein the selective reflection wavelength of the second liquid crystal panel 20 on the viewer side lies in the vicinity of 630 nm, the hue of white changes from yellow-greenish white to greenish white when the selective reflection wavelength of the first liquid crystal panel 10 is changed, while the hue of white changes from red-purplish white to achromatic white and further to yellow-greenish white.

This means that although the selective reflection wavelength of the second liquid crystal panel 20 determines the limitation in displaying white in achromatic fashion to some extent, the selective reflection wavelength of the first liquid crystal panel 10 on the short wavelength side can be properly set to obtain hue suited to application.

Figure 4:
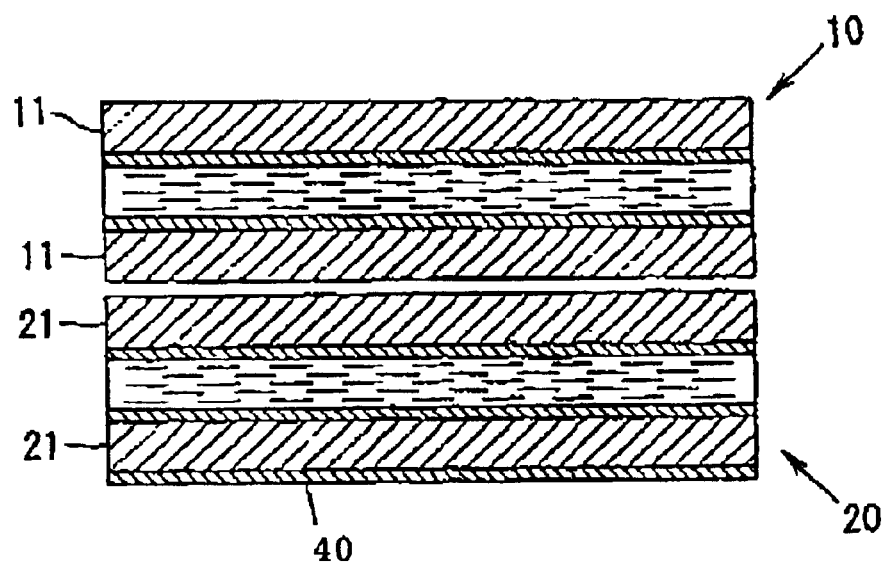
FIG. 4 is a schematic cross-sectional view showing the liquid crystal display device according to a second embodiment of the present invention

As shown in the schematic cross-sectional view of FIG. 4, the liquid crystal display device according to a second embodiment of the present invention have two liquid crystal panels of a first liquid crystal panel 10 and a second liquid crystal panel 20, the first liquid crystal panel being provided on a display side (an upper side in FIG. 4), and the second liquid crystal panel being provided on the rear side thereof (a lower side in FIG. 4 and also called a reverse display side.

Each of the liquid crystal panels 10, 20 has a pair of transparent electrode substrates 11, 11 or 21, 21 provided therein so as to confront each other. Between the respective paired transparent electrode substrates is sandwiched a liquid crystal developing a memory effect (a chiral nematic liquid crystal in this embodiment), which exhibits at least two different stable states of a planar state and a focal conic state with no voltage applied.

The second liquid crystal panel 20 on the rear side has a rear surface provided with a light-absorbing layer 40 (a black paint coating in the embodiment). The liquid crystal display device can be provided in a segment type or dot matrix type of display fashion.

Although both liquid crystal panels 10, 20 have the wavelength bands of the selective reflection in the planar state appearing in a visible region, the wavelength band of the first liquid crystal panel 10 on the display side relatively lies on a short wavelength side while the wavelength band of the second liquid crystal panel 10 on the rear side lies on a longer wavelength side than that of the first liquid crystal panel.

Figure 5:
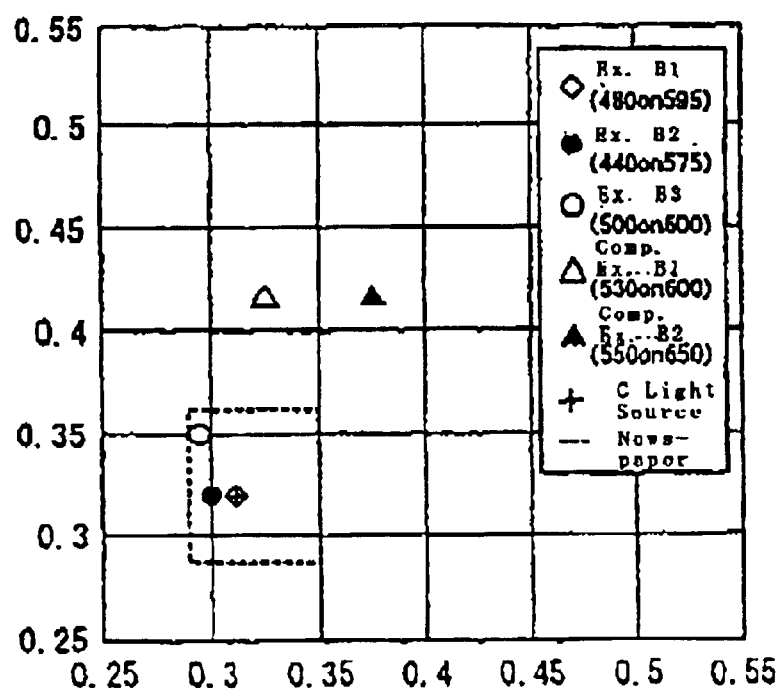
FIG. 5 is a schematic view wherein chromaticity values in examples according to the second embodiment of the present invention and comparative examples are plotted on C.I.E 1931 chromaticity coordinates.

In order to obtain good black and white display in a layered structure wherein the first liquid crystal panel 10 on the short wavelength side is provided on the display side and the second liquid crystal panel 20 on the long wavelength side is provided on the rear side, it is important that when the chiral nematic liquid crystal panels in the respective liquid crystal panels are both in a planar state exhibiting selective reflection, chromaticities lie in a region surrounded by four points of (0.29, 0.29), (0.35, 0.29), (0.29, 0.36) and (0.35, 0.36) on C.I.E.1831 chromaticity coordinates (the region surrounded by dotted lines in FIG. 5).

For this purpose, it is preferable that the selective reflection wavelength band of the first liquid panel 10 on the display side is 430–510 nm while the selective reflection wavelength band of the second liquid panel 20 is 560–660 nm.

The white display as generally defined means color purity contained in the region of the chromaticity coordinates delimited by a line connecting the four points of (0.29, 0.29), (0.35, 0.29), (0.29, 0.44) and (0.35, 0.44) on C.I.E.1831 chromaticity coordinates. A newspaper is listed as one of targets for obtaining paper-like appearance. When measurements are made by the same reflecting optical system, the chromaticity of a newspaper is (0.33, 0.33) and the Y value indicative of brightness is 83%. The Y value is a relative value to a white calibration plate.

Now, Examples A1 to A6 of the first embodiment of the present invention and Comparative Examples A1 to A5 will be explained. In each of the examples, the basic specification of the liquid crystal panel was as follows:

The glass substrates had a thickness of 0.4 mm and had both surfaces formed with insulating layers, and a double-sided polyimide film was provided as each alignment layer. The cell gap was set at 4 $\mu$m on the short wavelength side and 4.5 $\mu$m on the long wavelength side.

As the liquid crystal materials, photoactive chemical compounds represented by the following chemical formulas (a1), (a2) and (a3) were added to a commercially available nematic liquid crystal (MJ00423 manufactured by Merck Japan, Tc=94.0° C., $\Delta n \approx 0.230$, $\Delta \epsilon \approx 15.0$). With respect to each of the photoactive chemical compounds, the adding amount was adjusted to obtain a desired selective reflection wavelength.

(Chemical formula a1)

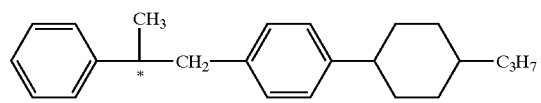

(Chemical formula a2)

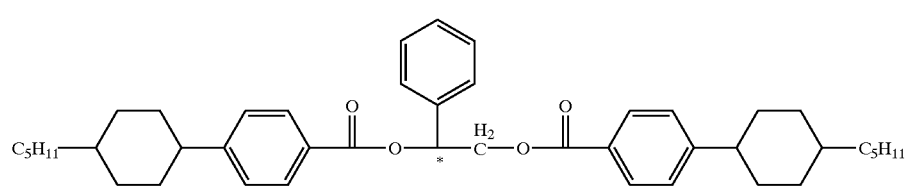

-continued

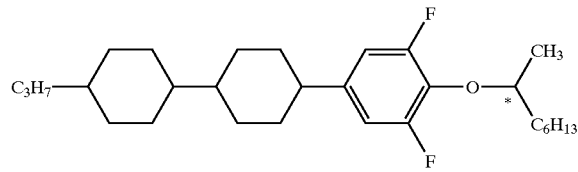

(Chemical formula a3)

The liquid crystal panel on the long wavelength side (the side opposite to the viewer side) had the rear side coated with a black paint for delustering.

The devices of Examples A1 to A6 were fabricated so that the devices could not only provide quite bright black and white display with high color purity but also display a chromatic color, such as red or blue. In order to display red, a specific color filter, which was associated with the selective reflection wavelength of the liquid crystal developing a memory effect on the long wavelength side, was combined to obtain good red display in each of the devices. It has been found that the brightness, the color purity and the hue of red are almost determined by a set selective reflection wavelength on the long wavelength side and the property of a color filter.

It was found that when a color filter was combined with a selective reflection wavelength on the long wavelength side, which realized red display having specific brightness and color purity, the achromatic level of available white display was limited to a certain range. As stated earlier, the setting of the selective reflection wavelength on the short wavelength side is quite limited in order to realize good white display.

With respect to the display level for white, it was found that the provision of a color filter lowered the brightness and the color purity of white to some extent in comparison with a two-layer structure without a color filter stated below. There was found a tendency that the viewing angle dependency, based on which, e.g., a displayed color was observed as different colors in a direct front view and in a slant view, was slightly worse. The conditions stated above were selected so as to suppress the viewing angle dependency as small as possible.

Figure 2:
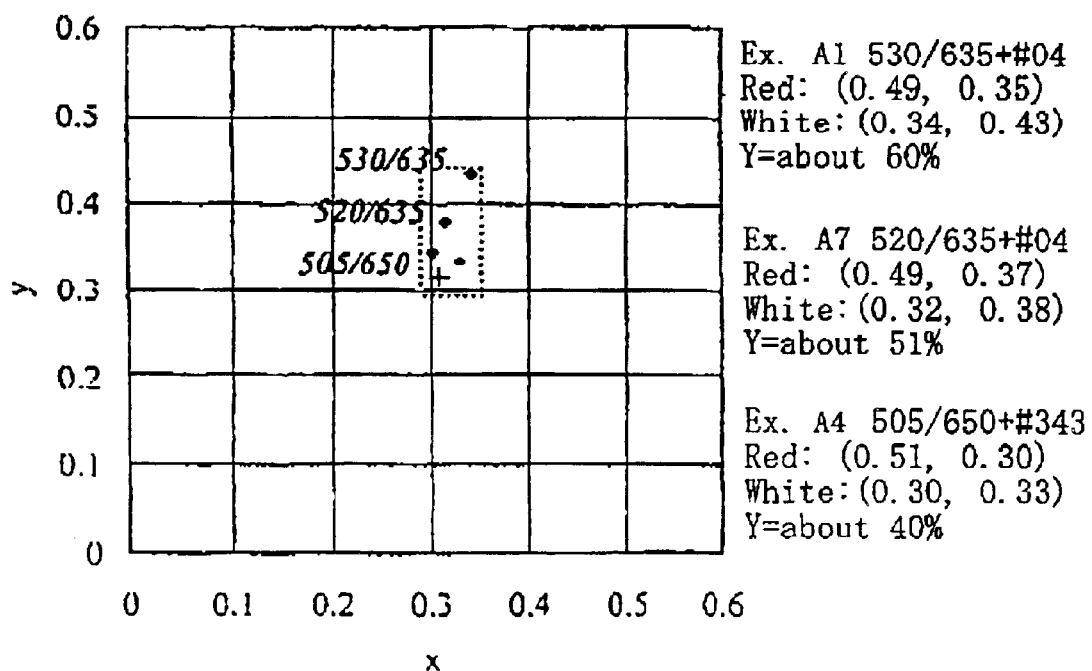
FIG. 2 is a schematic view showing color illumination state in Examples A1, A7 and A4 according to the present invention.

Referring now to FIG. 2, the red display means color purity, which is included in a region delimited by a boundary connecting four points of (0.47, 0.30), (0.60, 0.30), (0.47, 0.40) and (0.60, 0.40) on chromaticity coordinates or lies on the boundary.

The white display means color purity, which is included in a region delimited by connecting four points of (0.29, 0.29), (0.35, 0.29), (0.29, 0.44) and (0.35, 0.44) on the chromaticity coordinates or lies on the boundary. The coordinates are represented according to the C.I.E.1931 chromaticity coordinates.

It is preferable to utilize a color filter, the transmission property (the decrease in the transmission of the filter) of which is set such that the transmissivity in the vicinity of (the set wavelength on the long wavelength side—70) nm is not higher than 85% of the transmissivity in the vicinity of (the set wavelength on the long wavelength side—30) nm. It is preferable that one of the panels and the color filter are bonded together through an adhesive layer, which has the transmission in a set wavelength range on the long wavelength side set at 60% or higher.

The color layer may be prepared as a single sheet or be provided by applying a material having an equivalent optical property to the liquid crystal panel surface. The application treatment is more preferable since it is suited to mass-production.

EXAMPLE A1

In this example, multi-color display of black, white and red was provided by a two-layered structure in combination of a color filter. This example is suited to an electronic shelf label for food racks or the like. Important information is displayed in red on special sale. Bright red display having high color purity, and black and white display were able to be both provided. Although there are two kinds of vermilion color with slightly strong orange color contained and deep pinkish color as shades of red, the vermilion color was selected since warm colors are very popular for an electronic shelf label, which is particularly used at a food rack. By setting the selective wavelength on the short wavelength side at a certain value, black and white display, which is extremely close to achromatic display, as well as bright red display having high color purity, has become possible.

The selective reflection wavelength (the dominant wavelength) on the rear side (the side opposite to the viewer side) was set at 635 nm, and the selective reflection wavelength (the dominant wavelength) on the viewer side was set at 530 nm.

As the color filter was utilized a color filter for 100 different colors sold under the product name of Roscolux denoted by # 04 (a filter transmissivity of 66% and a lowering rate of 82% in filter transmissivity) and having a spectral chart (sold under the product name of Roscoloux).

In the following explanation, the Y values are relative values to the white calibration plate, the coordinates are represented according to the C.I.E. chromaticity coordinates, and the filter numbers indicate model numbers of the filter.

The multi-color illumination was provided as follows: The states of both layers for specific displayed colors are indicated by P (the planar state) and F (the focal conic state). The driving method disclosed in Japanese Patent Application No. 2001-285979 was utilized to drive the display.

The color illumination was configured to be provided (1) by a combination of P (short) and P (long) for slightly greenish white, (2) by a combination of F (short) and F (long) for black, (3) by a combination of F (short) and P (long) for vermilion red, and (4) by a combination of P (short) and F (long) for bluish green. The coordinate values of the respective displayed colors in the C.I.E. 1931 chromaticity coordinates were at (0.34, 0.43) for white, (0.49, 0.35) for red, (0.31, 0.29) for black, and (0.28, 0.46) for green.

A 250 W metal halide lamp was adopted as the light source and was located so that the incident angle was set at an angle of 20 deg to obtain reflection light from the liquid crystal panel at an angle of 0 deg. The ambient temperature was set at room temperature, the Y value was about 60%, and the contrast ratio was about 10.

Figure 3:
FIG. 3 is a schematic view showing an example of information provided by an electronic shelf label according to the first embodiment of the present invention.

By utilizing this example, multi-color display could be provided in the form of the electronic shelf label system shown in FIG. 3. The phrase "Today's" was displayed black, the phrase "Special" was displayed red, the phrase "Florida Grapefruit" was displayed black on a blue background, the phrase "regular price ¥140 each" was displayed black, the phrase "¥98" was displayed red, and the entire background was displayed slightly greenish white. (A color filter denoted by #04 for 530 nm/635 nm was utilized.) The entire background was set so as to provide nearly good white display when being seen from other directions than the front direction. The compatible level of white display and red display had a good mark "◯".

EXAMPLES A2 TO A3 AND COMPARATIVE EXAMPLES A1 TO A3

In Examples A2 to A3 and Comparative Examples A1 to A3, it was determined whether both white display and red display looked nice with the lowering rate in transmissivity of the color filters being changed under the condition that the selective reflection wavelength of the liquid crystals developing a memory effect on the viewer side was set at 530 nm. In Examples $A^4$ to A6 and Comparative Examples $A^4$ to A5, the selective reflection wavelength of viewer side liquid crystal panel is set to be 505 nm. In Table A1 shown below, a sign of "◯" indicates that both white display and red display looked nice, a sign of "Δ" indicates that red display looked nice while white display was not available, and a sign of "X" indicates that red display was not available.

The results shown in Table A1 show that as far as the lowering rate in the transmissivity of filters was in a specific range, clear red display can be provided since specific wavelength components unnecessary to red display can be suppressed.

TABLE 1

| | Set Wavelength of Panel on Long Wavelength side | Filter Number | Lowering Rate in Transmittance of Filter | Transmittance of Filter | Compatibility of red and white (Proper Ones Selected on Short Wavelength Side) |
|---|---|---|---|---|---|
| Example A1 | 635 nm | #04 | 82% | 66% | ◯ |
| Example A2 | 635 nm | #304 | 75% | 79% | ◯ |
| Example A3 | 635 nm | #40 | 47% | 34% | Δ |
| Example A4 | 650 nm | #343 | 31% | 33% | ◯ |
| Example A5 | 650 nm | #336 | 63% | 48% | ◯ |
| Example A6 | 650 nm | #43 | 29% | 28% | Δ |
| Comparative Example A1 | 635 nm | #05 | 88% | 80% | X |
| Comparative Example A2 | 635 nm | #06 | About 100% | 92% | X |
| Comparative Example A3 | 635 nm | #02 | 88% | 78% | X |
| Comparative Example A4 | 650 nm | #04 | 91% | 66% | X |
| Comparative Example A5 | 650 nm | #38 | 80% | 49% | X |

EXAMPLE A4

In a combination of a reflection wavelength of 505 nm on the viewer side and a selective reflection wavelength of 650 nm on the side opposite to the viewer side, a color filter for 100 different colors sold under the product name of Roscolux, denoted by # 343 (a filter transmissivity of 33% and a lowering rate of 31% in filter transmissivity) and having a spectral chart (sold under the product name of Roscoloux) was utilized as the color filter.

The values of the respective colors in the C.I.E. 1931 chromaticity coordinates were at (0.30, 0.33) for white, (0.51, 0.30) for red, (0.34, 0.28) for black, and (0.21, 0.37) for green. The white display and the red display were both good. The chromaticity values in xy chromaticity coordinates of Examples A1, A7 and A4 are shown in FIG. 2.

EXAMPLE A7

The liquid crystal display device was fabricated in the same way as Example A1 except that the selective reflection wavelength on the viewer side was set at 520 nm. The values of the respective colors in the C.I.E. 1931 chromaticity coordinates were at (0.32, 0.38) for white, (0.49, 0.37) for red, (0.31, 0.28) for black, and (0.22, 0.34) for green. The white display and the red display were both good.

EXAMPLE B1

The liquid crystal panel for the long wavelength side, which corresponded to the second liquid crystal panel 20 on the non-display side, was fabricated as follows:

Two glass substrates that have transparent conductive films of ITO (Indium Tin Oxide) formed thereon were prepared, and the respective substrates were etched to form electrode groups so as to obtain shapes, line distances and the number of electrodes suited for numeric display in hour and minute. After each of the substrates had an electrically insulating layer formed on the side with the transparent electrodes, a resin solution of polyimide was applied on the electrically insulating layer, and the applied resin solution was fired to form an alignment layer. The alignment layers on each of the substrates had a film thickness of about 60 nm. The alignment layer on each of the substrates was subjected to neither rubbing nor further treatment.

Both substrates were provided so as to have the electrodes confronted each other, and resin beards having a diameter of 4.8 μm were sprayed, as an inside spacer, in the space between the opposed surfaces of the substrates. A peripheral sealing material, which was composed of an epoxy resin containing a slight amount of glass fibers having a diameter of 4.8 μm, was applied to all four sides of one of the substrates excluding a portion corresponding to an liquid crystal filling port, and then, both substrates were bonded to fabricate a liquid crystal cell having a cell gap of 4.6 μm.

On the other hand, a chiral nematic liquid crystal composition was formulated by dissolving 5.1 parts by mass of a chiral agent represented by Chemical Formula b1, 5.1 parts by mass of a chiral agent represented by Chemical Formula b2 and 5.1 parts by mass of a chiral agent represented by Chemical Formula b3 into 84.7 parts by mass of a nematic liquid crystal composition having a clearing point of Tc=87° C., a refractive index anisotropy of Δn=0.231, an dielectric anisotropy of Δε=16.5, a viscosity of η=32 mPa·s and a specific resistance of $2 \times 10^{11} \Omega \cdot cm$, and mixing the chiral agents with the nematic liquid crystal composition. The helical pitch of the liquid crystal composition was about 0.38 μm.

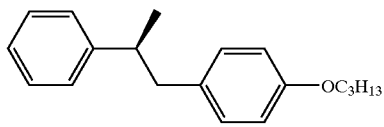

(Chemical Formula b1)

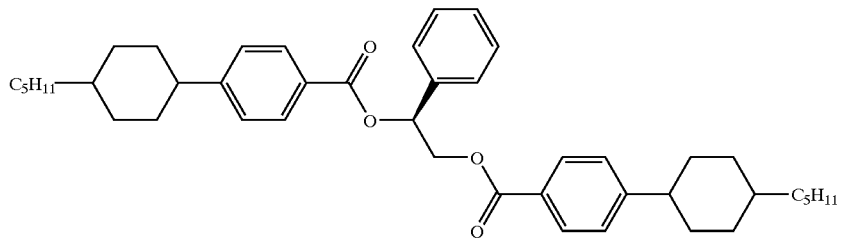

(Chemical Formula b2)

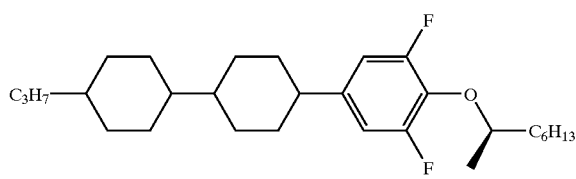

(Chemical Formula b3)

After the chiral nematic liquid crystal composition thus formulated was injected into the liquid crystal cell by a vacuum injection method, the injection port was sealed with a photocurable resin composition. The substrate of the liquid crystal panel on the rear side was coated with a black paint for delustering.

In the chiral nematic liquid crystal panel thus fabricated, the average direction of the alignment axes (helical axes) of the twisted structure having a certain repetitive cycle (pitch) faces in a direction substantially perpendicular to the electrode substrates in the planar state. The selective reflection occurs at a specific wavelength λ, which is determined by the pitch p and the average refractive index $n_{AVG}$ of the liquid crystal ($\lambda = n_{AVG} \cdot P$).

On the other hand, in the focal conic state, the helical axes face in random directions to the surfaces of the electrode substrates, allowing most of light to pass therethrough while scattering part of incident light. As a result, the color of the black paint applied on the rear side can be observed from the front side.

When the liquid crystal panel was deenergized after a bipolar rectangular wave pulse having a pulse width of 500 ms and a voltage of 30 V as the maximum effective voltage $V_{MAX}$ had been applied across electrode leads of the liquid crystal panel, all pixel portions turned to the planer state, and yellow light was reflected. The measurement of the spectrum of the reflected light by a reflection optical system showed that the peak wavelength was 595 nm. The peak wavelength is the selective reflection wavelength.

Next, when the liquid crystal panel was deenergized after a bipolar rectangular wave pulse having a pulse width of 20 V had been applied, the liquid crystal panel exhibits weak scattering caused by the focal conic state, the black as the background color was observed from the front side, and all pixel portions turned to be black. The chiral nematic liquid crystal panel is characterized in that although a high voltage is required to change the alignment state, the alignment state can be provided in stable fashion to ensure required contrast even after shutting off the voltage.

The liquid crystal panel for the short wavelength side, which corresponded to the first liquid crystal panel 10 on the display side, was fabricated in the same technique as the liquid crystal panel on the long wavelength side except that the respective chiral agents were dissolved and mixed together such that the helical pitch of the liquid crystal composition was set at about 0.31 μm and the cell gap was set at 3.6 μm.

When the liquid crystal panel for the short wavelength side was deenergized after a bipolar rectangular wave pulse having a pulse width of 500 ms and a voltage of 30 V as the maximum effective voltage $V_{MAX}$ had been applied across electrode leads of the liquid crystal panel, all pixel portions turned to the planer state, and blue light was reflected. The measurement of the spectrum of the reflected light by the reflection optical system showed that the peak wavelength (dominant wavelength) was 490 nm. Next, when the liquid crystal panel for the short wavelength side was deenergized after a bipolar rectangular wave pulse having a pulse width of 20 V had been applied, the liquid crystal panel exhibits weak scattering caused by the focal conic state.

The liquid crystal panel for the short wavelength side and the liquid crystal panel for the long wavelength side were integrally layered by means of an epoxy resin composition such that the liquid crystal panel for the short wavelength side was provided on the display side and the liquid crystal panel for the long wavelength side was provided on the rear side. When the chiral nematic crystals of both liquid crystal panels were simultaneously exhibited the planar state, the liquid crystal cell provided nearly good white display that had a brightness of Y=47% and a chromaticity of (0.30, 0.32). At that time, the contrast was 3.4.

EXAMPLE B2

Another liquid crystal cell was fabricated in the same way as in Example B1 except that the liquid crystal panel for the short wavelength side had a cell gap set at 3.6 μm and a peak wavelength set at 440 nm in the selective reflection, and the liquid crystal panel for the long wavelength side had a cell gap of 4.6 μm and a peak wavelength of 575 nm in the selective reflection.

The liquid crystal cell thus fabricated had a brightness of Y=53% and a chromaticity of (0.30, 0.328) and provided nearly good white display as in Example B1. At that time, the contrast was 3.8.

EXAMPLE B3

Another liquid cell was fabricated in the same way as in Example B1 except that the liquid crystal panel for the short wavelength side had a cell gap set at 4.0 μm and a peak wavelength set at 500 nm in the selective reflection, and the liquid crystal panel for the long wavelength side had a cell gap of 4.6 μm and a peak wavelength of 600 nm in the selective reflection.

The liquid crystal cell thus fabricated had a brightness of Y=53% and a chromaticity of (0.30, 0.35) and provided display that was enough bright to be recognized as being white. At that time, the contrast was 3.5.

COMPARATIVE EXAMPLE B1

Another liquid cell was fabricated in the same way as in Example B1 except that the liquid crystal panel for the short wavelength side had a cell gap set at 4.6 μm and a peak wavelength set at 530 nm in the selective reflection, and the liquid crystal panel for the long wavelength side had a cell gap set at 4.0 μm and a peak wavelength set at 600 nm in the selective reflection, The liquid crystal cell thus fabricated had a brightness of Y=62% and a chromaticity of (0.33, 0.42) and provided yellow-greenish white display. At that time, the contrast was 3.5.

COMPARATIVE EXAMPLE B2

Another liquid cell was fabricated in the same way as in Example B1 except that the liquid crystal panel for the short wavelength side had a cell gap set at 4.0 μm and a peak wavelength set at 550 nm in the selective reflection, and the liquid crystal panel for the long wavelength side had a cell gap of 5.0 μm and a peak wavelength of 650 nm in the selective reflection.

The liquid crystal cell thus fabricated had a brightness of Y=62% and a chromaticity of (0.38, 0.42) and provided yellow-greenish white display. At that time, the contrast was 3.5.

A table wherein the contents of Examples 1 to 3 and Comparative Examples B1 and B2 are summarized is shown below as reference.

|  | Combination | Brightness Y | maxCR | X | Y |
|---|---|---|---|---|---|
| Example B1 | 480 on 595 | 47 | 3.4 | 0.31 | 0.32 |
| Example B2 | 440 on 575 | 53 | 3.8 | 0.30 | 0.32 |
| Example B3 | 500 on 600 | 53 | 3.5 | 0.30 | 0.35 |
| Comparative Example B1 | 530 on 600 | 62 | 3.5 | 0.33 | 0.42 |
| Comparative Example B2 | 550 on 650 | 62 | 3.5 | 0.37 | 0.42 |
| Reference | Newspaper | 83.2 |  | 0.33 | 0.33 |
|  | C Light Source |  |  | 0.31 | 0.32 |

Now, another example of the second embodiment of the present invention will be explained. In this example, each of the glass substrates had a thickness of 0.4 mm, and had both surfaces formed with insulating layers and a double-sided polyimide film used as each alignment layer, The cell gap was set at 4 μm on the short wavelength side and 4.5 μm on the long wavelength side. As the liquid crystal materials, photoactive chemical compounds represented by Chemical Formulas b4, b5 and b6 listed below were added to a commercially available nematic liquid crystal (MJ00423 manufactured by Merck Japan, Tc=94.0° C., Δn=0.230, Δε=15.0). With respect to each of the photoactive chemical compounds, the adding amount was adjusted to obtain a desired selective reflection wavelength.

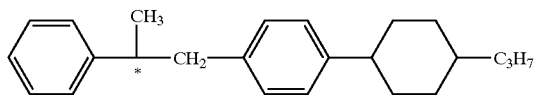

(Chemical Formula b4)

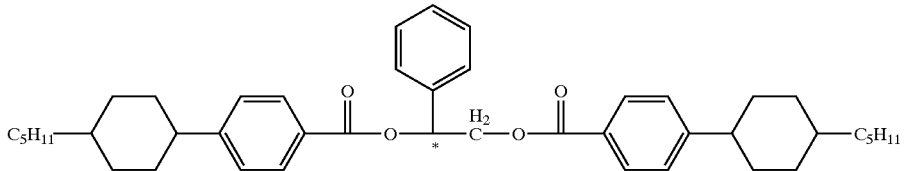

(Chemical Formula b5)

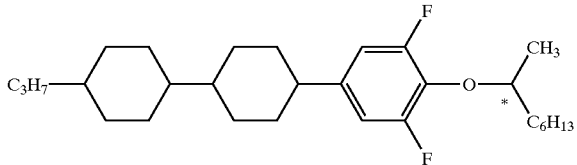

(Chemical Formula b6)

The selective reflection wavelength (the dominant wavelength) on the long wavelength side (the reverse display side) was set at 620 nm, while the selective reflection wavelength (the dominant wavelength) on the short wavelength side (the display side) was set at 490 nm. The liquid crystal panel on the long wavelength side had the rear side coated with a black paint for delustering.

The display format was a dot matrix layout, which comprised a plurality of common electrodes and a plurality of segment electrodes. As the driving method for the display format, was adopted a method which comprised applying a voltage for bringing the liquid crystals developing a memory effect across into ON display by, at least one time, scanning common electrodes so as to select all common electrode one by one, and then applying a voltage corresponding to display data across the voltage-applied liquid crystals. The following multi-color display patterns were obtained:

In the following explanation, the phrase (Short) means the short wavelength side, the phrase (long) means the long wavelength side, the letter P means the planar state, and the letter F means the focal conic state.

(1) White display was provided by a combination of P (short) and P (long), (2) black display was provided by a combination of F (short) and F (long), (3) yellow display was provided by a combination of F (short) and P (long), and (4) blue display was provided by a combination of P (short) and F (long). Thus, the multi-color display could be attained by controlling the display data and the phase states of the respective crystal liquid panels.

The brightness of white display was a Y value of about 45%, and the contrast ratio was about 6. The values of the respective colors in the chromaticity coordinates were at (0.29, 0.31) for white, (0.24, 0.25) for black, (0.41, 0.36) for yellow, and (0.18, 0.25) for blue.

As explained, in accordance with the first embodiment of the present invention, a color layer, which has specific transmissivity property for the selective reflection wavelength of the liquid crystal on the side opposite to a viewer side in a two-layered panel, can be provided between liquid crystals to obtain clear red display. In a specific combination of selective reflection wavelengths, clear red display and bright black and white display can be compatible each other.

In particular, when a liquid crystal display device includes liquid crystals developing a memory effect that exhibit at least two stable states, a plurality of common electrodes and a plurality of segment electrodes, the common electrodes being scanned so as to be selected one by one, when a chiral nematic liquid crystal or a cholesteric liquid crystal is used as each of the liquid crystals developing a memory effect, when there are provided at least two liquid crystal panels including the liquid crystals developing a memory effect, when the liquid crystal developing a memory effect on a side opposite to a viewer side has a selective reflection wavelength set at 615 to 665 nm, when the liquid crystal developing a memory effect on the viewer side has a selective reflection wavelength set at 490 to 540 nm, and when a color layer having a certain transmission property is provided between the liquid crystal developing a memory effect on the viewer side and the liquid crystal developing a memory effect on the side opposite to the viewer side, red display can be obtained in clearer fashion than ever without degrading the brightness in black and white display, in spite of adoption of a two-layered structure.

As explained, in accordance with the second embodiment of the present invention, the liquid crystal display device includes two of the first liquid crystal panel and the second crystal panel, each of which includes a liquid crystal developing a memory effect, such as a chiral nematic liquid crystal, has the display side provided with the first crystal panel having the wavelength band in the selective reflection on the short wavelength side, has the rear side provided with the second crystal panel having the wavelength band in the selective reflection on the long wavelength side, and controls the phase states of the liquid crystals developing a memory effect to provide multi-color display. In the multi-color display, when the first and second liquid crystal panels are provided in layers with both liquid crystals developing a memory effect that exhibits selective reflection in the planar state, chromaticities lie in a region surrounded by four points of (0.29, 0.29), (0.35, 0.29), (0.29, 0.36) and (0.35, 0.36) on C.I.E.1931 chromaticity coordinates. As a result, the present invention can in particular display white in achromatic fashion to obtain clear black and white display.

The present application claims priorities under 35 U.S.C. §119 to Japanese Patent Applications No. 2001-302928, filed on Sep. 28, 2001 and entitled "LIQUID CRYSTAL DISPLAY DEVICE", No. 2001-304596 "LIQUID CRYSTAL DISPLAY ELEMENT", and No. 2001-285979 "LIQUID CRYSTAL DISPLAY DEVICE AND DRIVING METHOD THEREFOR". The contents of the applications are incorporated herein by reference in their entirety.

What is claimed is:

1. A liquid crystal display device comprising:
   at most two liquid crystal panels, wherein;
   a first liquid crystal panel and a second liquid crystal panel exhibiting at least two stable states of a planar state and a focal conic state with no voltage applied;
   the first liquid crystal panel and the second liquid crystal panel each comprising a liquid crystal with a memory effect,
   the liquid crystal having selective reflection wavelenghts in the planar state appearing in a visible range,
   the first liquid crystals panel and the second liquid crystal panel having different selective reflection wavelengths;
   the first liquid crystal panel and the second liquid crystal panel being combined to be respectively provided on a viewer side and on a no-viewer side;
   wherein the first liquid crystal panel has a shorter selective reflection wavelength than the second liquid crystal panel;
   the selective reflection wavelength of the first liquid crystal panel being set in a range from 430 nm to 540 nm, and
   the selective reflection wavelength of the second liquid crystal panel being set in a range from 560 nm to 665 nm,
   whereby at least a black display and a white display can be provided.

2. The liquid crystal display device according to claim 1, wherein chromaticities lie in a region surrounded by four points of (0.29, 0.29), (0.35, 0.29), (0.29, 0.36) and (0.35, 0.36) on C.I.E. 1931 chromaticity coordinates, the chromaticities being observed by a viewer when the first and second liquid crystal panels are provided in layers, both panels being in the planar state.

3. The liquid crystal display device according to claim 2, wherein the selective reflection wavelength of the first liquid panel is in a range from 430 nm to 510 nm, and the selective reflection wavelength of the second liquid panel is in a range of from 560 nm to 660 nm.

4. The liquid crystal display device according to claim 1, wherein the liquid crystal device further comprises a color layer having a certain transmissive property, whereby display in a third color can be provided in addition to the black display and the white display.

5. The liquid crystal display device according to claim 4, wherein the selective reflection wavelength of the first liquid panel is in a range from 490 nm to 540 nm, the selective reflection wavelength of the second liquid panel is in a range of from 615 nm to 665 nm, and the color layer is red providing a red display.

6. The liquid crystal display device according to claim 4, wherein the transmission property of the color layer is set such that a transmissivity at a wavelength shorter than the selective reflection wavelength of the second liquid crystal panel by 70 nm is not higher than 85% of the transmissivity at a wavelength shorter than the selective reflection wavelength of the second liquid crystal panel by 30 nm.

7. The liquid crystal display device according to claim 4, wherein a red display is provided by the color layer having a chromaticity delimited by connecting four points of (0.47, 0.30), (0.60, 0.30), (0.47, 0.40) and (0.60, 0.40) on C.I.E. chromaticity coordinates, and the white display is provided by the color layer having a chromaticity delimited by connecting four points of (0.29, 0.29), (0.35, 0.29), (0.29, 0.44) and (0.35, 0.44) on the C.I.E. chromaticity coordinates.

8. The liquid crystal display device according to claim 1, wherein the liquid crystals with a memory effect are chiral nematic liquid crystals or cholesteric liquid crystals.

9. A liquid crystal display device comprising:

at most two liquid crystal panels;

a first liquid crystal panel and a second liquid crystal panel exhibiting at least two stable states of a planar state and a focal conic state with no voltage applied;

the first liquid crystal panel and the second liquid crystal panel each comprising a liquid crystal with a memory effect, the liquid crystals having selective reflection wavelengths in the planar state appearing in a visible range, the first liquid crystal panel and the second liquid crystal panel having different selective reflection wavelengths;

the first liquid crystal panel and the second liquid crystal panel being combined to be respectively provided on a viewer side and on a no-viewer side;

wherein the first liquid crystal panel has a shorter selective reflection wavelength than the second liquid crystal panel; and a color layer provided between the liquid crystal of the first liquid crystal panel and the liquid crystal of the second liquid crystal panel, wherein the color layer has a transmission property that is set such that the transmissivity at a wavelength shorter than the selective reflection wavelength of the second liquid crystal panel by 70 nm is not higher than 85% of the transmissivity at a wavelength shorter than the selective reflection wavelength of the second crystal panel by 30 nm, whereby at least a white display can be provided.

10. The liquid crystal display device according to claim 9, wherein when the selective reflection wavelength of the second liquid panel is in a range from 630 nm to 640 nm, the color layer has a transmission property that is set such that the transmissivity at a wavelength in a range from 560 nm to 570 nm is not higher than 85% of the transmissivity at a wavelength in a range from 600 nm to 610 nm.

11. The liquid crystal display device according to claim 9, wherein the selective reflection wavelength of the second liquid panel is in a range from 645 nm to 655 nm, the color layer has a transmission property that is set such that the transmissivity at a wavelength in a range from 575 nm to 585 nm is not higher than 70% of the transmissivity at a wavelength in a range from 615 nm to 625 nm.

12. A method for preparing a liquid crystal display device, comprising:

liquid crystals with a memory effect, the liquid crystals exhibiting at least two stable states of a selective reflection state and a transmissive state with no voltage applied; and at most two liquid crystal panels;

a first liquid crystal panel and a second liquid crystal panel provided in layers, the first liquid crystal panel and the second liquid crystal panel having different selective reflection wavelengths; and the method comprising:

providing a color layer on the rear side;

controlling the selective reflection wavelengths of the respective liquid crystal panels so that the midpoint between coordinates corresponding to two developed colors produced under a standard light source lies at a position apart from the white point by a distance of not greater than 0.03 on C.I.E. xy chromaticity coordinates wherein the two developed colors are indicated on the xy chromaticity coordinates with one of the liquid crystal panels being in the selective reflection state, and the other being in the transmissive state; and providing white by mixing at least the two developed colors and a color (except white) developed by the color layer.

13. The method for preparing a liquid crystal display device according to claim 12, further comprising;

providing a filter layer having a specific transmissive color between the first liquid crystal panel and the second liquid crystal panel; and providing at least the color (except white) developed by the color layer, white prepared by the two developed colors and the filter layer, and a red color prepared by the filter layer.

14. The method for preparing a liquid crystal display device according to claim 12, further comprising providing the filter layer by use of a resist having a light transmissive property;

providing the filter layer in contact with the liquid crystal of the liquid crystal panel on a no-viewer side; and providing the filter layer under a driving electrode.

15. The method for preparing a liquid crystal display device according to claim 12, wherein the red color lies in a range of x=0.43 to 0.50 and y=0.29 to 0.37 on the xy chromaticity coordinates.

16. The method for preparing a liquid crystal display device according to claim 12, wherein a pigment resist is provided as the color layer.

17. The method for preparing a liquid crystal display device according to claim 12, wherein the standard light source is a C light source.

* * * * *